United States Patent Office 3,511,916
Patented May 12, 1970

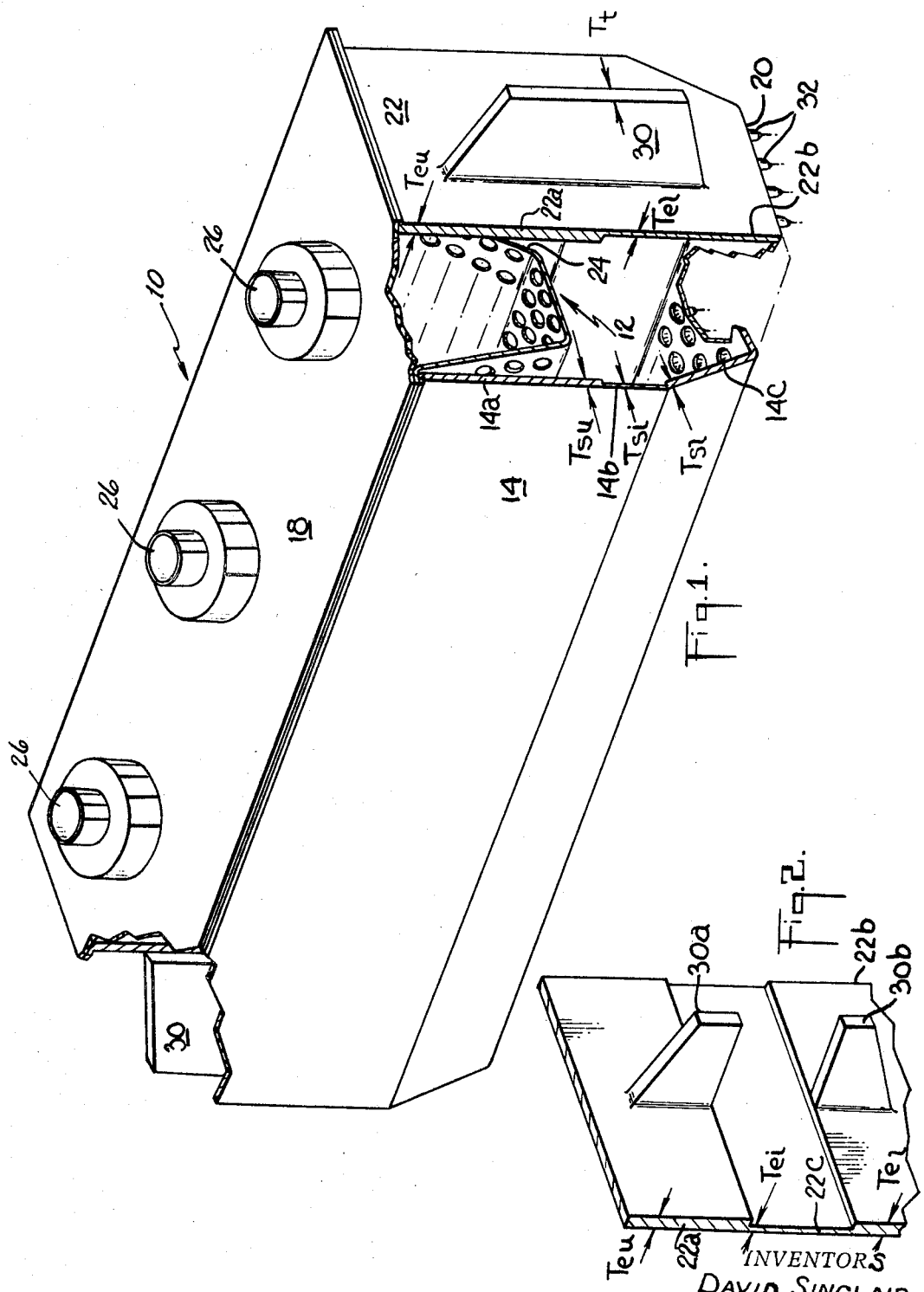

3,511,916
ELECTRIC RESISTANCE BUSHING FOR FORMING GLASS FIBERS
David Sinclair, Martinsville, N.J., and Walter William Harris, Toledo, Ohio, assignors to Johns-Manville Corporation, New York, N.Y., a corporation of New York
Filed Mar. 29, 1967, Ser. No. 626,844
Int. Cl. C03b 37/02, 5/16
U.S. Cl. 13—6                                    8 Claims

ABSTRACT OF THE DISCLOSURE

An electrical resistance type of metal bushing for rendering materials molten, the wall thicknesses in certain areas being selectively different from the wall thicknesses in other areas to preferentially control the heat generation to various zones of the chamber defined by the bushing.

Background of the invention

This invention is directed to method and apparatus for producing rod-like stock from heat-softenable material, such as glass, and in sufficiently small diameter to be pliable, either as continuous filaments of indefinite length, or as short discrete pieces.

The invention particularly relates to method and apparatus for exuding molten material to feed a plurality of exudations from which primary filaments are formed. This type of feeder, generally in the form of a trough, is referred to as a bushing. The bushing usually forms an electrical resistance heating element with suitable electrical circuit connecting terminals or lugs at the axial ends of the trough. The current to the terminals is usually provided by means of water cooled current clamps. The top wall of the bushing is provided with one or more feed holes for feeding raw solid particles of material to be melted in the chamber defined by the bushing. Baffle means, which may be in the form of a perforated basket, is usually provided to prevent the raw particles from settling directly to the bottom of the chamber. The bottom wall of the bushing is provided with orifices through which molten material flows to form the exudations. The primary filaments are drawn and attenuated from the exudations as continuous fibers, usually by means of a rotating mandrel, or as discontinuous or "staple" fibers by means of a fluid blast, such as a gaseous stream from a burner.

In order to reduce heat loss to the ambient air the sidewalls are usually well insulated. Such insulation of the sidewalls, the proximity of the endwalls to the water cooled current clamps, and the direct exposure of the feed holes and the bottom of the bushing to the ambient air, all contribute to non-uniform heat dissipation in the bushing walls. The introduction of cool particles, usually in the form of glass marbles, additionally contributes to the variation in temperature gradient throughout the bushing.

In order to operate a bushing in balance, i.e., with the same apparent flow of glass from each of the orifices, it is necessary that the temperature of the bushing be maintained generally constant from end-to-end of the bushing. The temperatures of the ends relative to the middle of the bushing can be varied by adjusting the positions of the electrical terminals at the ends of the trough. Moving the terminals closer to the trough portion of the bushing, i.e., closer toward each other, increases the exposure of the bushing to the water cooling of the terminal and thus tends to lower the temperature of the bushing at its ends. In some bushings, uniform temperature and glass flow cannot be effected by terminal or clamp adjustment only. Even when the terminals are moved in as far as possible, the temperature at the orifices at the ends of the bushing is so high that the molten material flows too rapidly from those tips.

It has been a practice in the past to construct melting bushings with longitudinally extending sidewalls, each having a uniform thickness throughout its height. However, because the top portions of the sidewalls were "looking at cold marbles," the heat distribution and generation patterns from the sidewalls were disrupted. As an attempt to increase the heat distribution to the top (or melting) zone of the bushing, the thickness of the sidewall was reduced in this zone. This probably was done on the theory that the resistance of the sidewall in the top portion would be increased and hence the heat generation in that zone would be increased.

One attempt that has been made to compensate for the unbalance in heating conditions across the length of the glass melting bushing having three feed holes is to feed the glass marbles through the end feed holes at a faster rate than through the center feed hole. The end cooling is attained by virtue of the mass of cold marbles at the ends of the bushing. This unbalanced feeding is undesirable because of the differences in temperature and of the glass level produced within the bushing and with a resultant loss in efficient output.

Objects and summary of the invention

It is an object of this invention to provide improved method and apparatus for increasing the melting efficiency of bushings used for melting heat-softenable material and forming fibers.

Another object is to provide improved means for preferentially controlling the heat generation in an electrical resistance type metal bushing.

Briefly, the objects are attained by providing an electrical resistance type metal bushing having a plurality of longitudinally extending heating zones disposed in vertical array, wherein a lower zone, adjacent the bottom wall, is defined by a pair of opposing longitudinally extending wall sections, each having a given thickness T; an upper zone defined by a pair of opposing longitudinally extending wall sections, each having a thickness at least as great as T; and an intermediate zone defined by a pair of opposing longitudinally extending walls, each having a thickness less than T. In a preferred embodiment, the endwalls are each comprised of at least two sections, a bottom section having a thickness greater than T, and more preferably at least 1.5 T, and an upper section having a thickness greater than that of the bottom section, and more preferably a thickness in the order of twice the thickness of the bottom section. The provision of the increased thicknesses of the upper end wall sections and of the walls defining the upper zones facilitate the distribution of increased heat generated by the energizing electrical current to the upper zone. The provision of the intermediate zone provides a "separation" between the upper and lower zones so that the distribution of heat to the upper zones may be selectively controlled without unduly affecting or altering the heat balance amongst the several orifices in the lower zone when adjustments are made to increase the heat generated to the upper zone. An increase in heat generation to the top level (upper zone) of the glass in the bushing results in a higher head of molten glass above the orifices, which in turn facilitates an increase in production rate of the fibers being formed.

Description of drawing

The invention will be more fully understood and further objects and advantages thereof will become apparent when reference is made to the following detailed description and to the accompanying drawing, in which:

FIG. 1 is an isometric view of the bushing of this invention with a portion "broken away" to illustrate in more detail the wall construction; and FIG. 2 is an isometric view of a fragmentary portion of a bushing, similar to that shown in FIG. 1 but illustrating an alternate embodiment of end wall construction.

Description of preferred embodiments

Referring to FIG. 1 of the drawing, there is illustrated a bushing 10 defining a melting chamber 12. The bushing 10 is made of metal and is designed to retain molten glass for sustained periods at glass melting temperatures. The bushing includes sidewalls 14. Preferably, each of the sidewalls has an upper portion 14a joined to top 18 of generally horizontal disposition. Each of the sidewalls 14 has a lower portion 14c which lower portion 14c preferably slopes inwardly and downwardly and is joined to bottom wall 20. The bottom wall 20 is generally horizontally disposed. Endwalls 22 are fitted to the top, side and bottom walls to form the enclosed chamber 12 which is adapted to retain glass in molten form. Additionally, the bushing 10 may be provided with a perforated basket 24, or other suitable means, for retaining solid increments of glass in the upper portion of the chamber 12 until the increments are rendered molten.

One or more inlet openings 26 are provided in the top 18 for the introduction of the solid glass increments into the interior of melting chamber 12. Each of the end walls 22 is provided with a terminal lug 30 for connection to a source of electric current (not shown), whereby the bushing 10 is heated by electrical resistance. The bottom wall 20 defines a plurality of orifices 32, which may be in the bottom wall per se or within inserted tips, through which molten glass is exuded to form exudations at the termini of the orifices 32. The exudations are drawn out into primary filaments which may be attenuated into fine fibers. The viscosity of the glass and the surface adhesion between the glass and the bottom surfaces of the metal defining the orifices are maintained during the drawing process to permit the formation of the exudations from which filaments may be formed. This is in contrast to so-called disintegrating devices wherein molten material is flowed through one or more orifices and immediately blasted to distintegrate the molten flow.

In one form of conventional bushing for melting glass marbles the thickness of each of the sidewalls is generally uniform throughout its height. In another form of bushing that has been tried, the sidewall thickness is decreased in ascending height order, i.e., a middle portion is thinner than a lower portion and an upper portion is thinner than the middle portion. However, in each of these forms, the thickness of each of the end walls is substantially uniform throughout the height thereof. In these forms of bushings the melt rate has been limited because of the relatively cold top level or zone where the cold marbles are introduced. Attempts to increase the heat transfer from the bushing sidewalls to the marbles by increasing the overall electrical input to the bushings have resulted in "hot spots" being generated at the ends of the bushings. As a result the melting rate at the orifices at the ends of the rows is increased to such an extent that the glass becomes less viscous and "streaks out." When glass "streaks out" it does not form the exudations at the termini of the orifices from which filaments may be drawn and attenuated.

In accordance with the present invention, provision is made for increasing the heat generated to the top portion of a bushing but without the generation of "hot spots" at or near the axial ends of the bushing. Toward contributing to this accomplishment, the thicknesses of the metal in certain areas of the bushing have been increased in relation to other areas. Since the energy conversion in a bushing from electrical input to the actual transfer of heat into the glass is complex, it is not obvious, as might appear at first blush, to design a bushing that will provide the necessary heat generation and maintain the desired temperature gradient in all parts of the bushing. As a matter of fact, one of the attempts to relieve the "hot spots" at the bottom level and near the axial ends of a bushing was to provide an increased wall thickness at these "hot spot" areas. This was done, at least partly, on the theory that the increased thickness would decrease the electrical resistance and eliminate the "hot spots," but such was not the case.

In the instant invention, the thickness $T_t$ of the terminal lugs 30 was substantially increased to facilitate the reduction of heat generation at the ends of the bushing. The effective height of each of the terminal lugs 30 was also substantially increased by increasing the area of each lug near the top portion thereof, i.e., by decreasing the downward taper of the lug away from the bushing. This was done in order to increase the effective area, adjacent to the upper level of the bushing, available to establish contact with the connecting electrical terminals. By positioning the connecting terminals closer to the top of the terminal lugs 30 than to the bottom, it is thus possible to direct more current and generate more heat in the upper level of the bushing.

To further enhance heat generation toward the upper level of the bushing, the thickness $T_{eu}$ of the upper section 22a of each of the endwalls 22 was substantially increased, preferably so that the thickness $T_{eu}$ is generally about twice the thickness $T_{el}$ of the lower endwall section 22b.

A particular feature of this invention is the provision of longitudinally extending sidewalls 14 having an intermediate section 14b with a thickness $T_{si}$ which is less than the thickness $T_{su}$ of an upper sidewall section 14a. The thickness $T_{sl}$ of the lower sidewall section 14c is preferably greater than $T_{si}$. Such an arrangement provides a plurality of vertical heating zones, 14A, 14B and 14C, corresponding to and defined by the sidewall sections 14a, 14b and 14c, respectively, and wherein the heat generation to an intermediate zone 14B is less than to a superjacent upper zone 14A. Preferably, the thickness $T_{su}$ is in the order of 1.5 to 2 times the thickness $T_{si}$, and generally the same as thickness $T_{sl}$. Such an arrangement also provides a more pronounced separation of the upper heating zone 14A from the lower heating zone 14C and wherein increased heat generation may be better controlled without undue disturbance of the heat balance or thermal gradient across the length of the lower zone 14C.

As a further aid to providing a more pronounced separation of the upper and the lower heating zones, each of the endwalls 22 may be optionally provided with an intermediate section 22c, as shown in FIG. 2, of reduced thickness $T_{ei}$, as compared with the thickness $T_{eu}$ and $T_{el}$. Additionally, and optionally, the terminal lugs 30 may be split to provide an upper section 30a and a lower section 30b. It is believed that these further aids contribute to an arrangement, having the advantages of a bushing where separate electrical input controls and connections are provided for each of an upper and a lower heating zone, but with the need of only one pair of electrical connection clamps. When it is desired to direct more heat toward the upper part of the bushing, the clamps are positioned so that more surface contact is established with the upper section 30a than with the lower secion 30b of each of the terminal lugs 30.

The invention provides a method for the preparation of molten material, such as from glass marbles, to be drawn into filamentary form. The material is rendered molten and exposed to the heat generated from the walls of a melting bushing, which bushing has a plurality of vertical heating zones. These zones are defined and bounded along their longitudinal extents by electrically conductive metal walls. The material is first exposed to the heat from the wall sections of the upper (or superjacent) zone where it is rendered molten. The molten material passes to an intermediate zone where it is exposed to the heat from the wall sections having a thickness which is less than that of the superjacent zone wall sections. The molten material then passes to a lower (subjacent) zone having sidewall sections of a thickness which is greater than the thickness of the intermediate zone sidewall sections. The lower and intermediate zones are generally of the same height while the height of the upper zone is approximately equal to the sum of the heights of the lower and intermediate zones.

Tests have been conducted for comparison of production melt rates between a bushing of the type disclosed in FIG. 1 (15 inches long) and what may be regarded as a standard 15 inch bushing. The bushing of this invention has produced melt rates which are 15 to 21.4% higher than the standard bushing. It is believed that the increase in heat generation to the top level of glass, with a resultant increase in "head" of molten glass above the orifices, and the relatively cooler operation temperatures in the bottom level at the longitudinal ends of the bushing have contributed greatly to this higher melt rate.

The following tables of the thermocouple (T.C.) readings (° F.) taken from a bushing embodying this invention and from a standard bushing operating under the same conditions, substantiate that the features of increased top level heat generation and the cooler bottom end temperatures are obtainable in the bushing of this invention. The readings for the standard bushing are enclosed in parentheses.

| T.C. position, vertical level | Longitudinal extent | | |
|---|---|---|---|
| | End | Center | End |
| Top | 2,475 (2,400) | 2,283 (2,310) | 2,478 (2,403) |
| Intermediate | 2,375 (2,336) | 2,351 (2,312) | 2,377 (2,342) |
| Bottom | 2,303 (2,320) | 2,263 (2,290) | 2,308 (2,324) |

What we claim is:

1. An electrical resistance type metal bushing for supplying molten material in the form of exudations to be attenuated into filaments, wherein said bushing comprises side, end, and bottom walls, the improvement wherein:
   each of said side walls is comprised of a longitudinally extending upper sidewall section, a longitudinally extending intermediate sidewall section and a longitudinally extending lower sidewall section; and the wall thickness of said upper longitudinally extending sidewall section is greater than the wall thickness of said intermediate longitudinally extending sidewall section.

2. The bushing as described in claim 1, which further comprises:
   means for retaining solid increments of raw material in an upper portion of said bushing until increments are rendered molten, and said longitudinally extending intermediate sidewall section is at a level corresponding to the bottom of said means.

3. The bushing as described in claim 1 wherein:
   the wall thickness of said lower longitudinally extending sidewall section is greater than the wall thickness of said intermediate longitudinally extending sidewall section, and the wall thickness of said upper longitudinally extending sidewall section is at least as great as the wall thickness of said lower longitudinally extending sidewall section.

4. The bushing as described in claim 1, wherein:
   the wall thickness of said upper longitudinally extending sidewall section is generally twice the wall thickness of said intermediate longitudinally extending sidewall section.

5. The bushing as described in claim 1, wherein:
   each of the end walls is comprised of an upper endwall section and a lower endwall section, and the wall thickness of said upper endwall section is greater than said lower endwall section and greater than the wall thickness of said upper sidewall section.

6. The bushing as described in claim 5, wherein:
   the wall thickness of said upper endwall section is at least twice the thickness of said lower endwall section.

7. The bushing as described in claim 5, wherein:
   each of said endwalls is further comprised of an intermediate endwall section having a wall thickness less than the wall thickness of said upper endwall section.

8. The bushing as described in claim 7, wherein:
   each of said endwalls is provided with a terminal lug for connection to a source of electric power, and said terminal lug is comprised of generally separated upper and lower sections.

References Cited
UNITED STATES PATENTS

| | | | |
|---|---|---|---|
| 2,212,528 | 8/1940 | Slayter. | |
| 2,360,373 | 10/1944 | Tiede | 65—1 |
| 3,305,332 | 2/1967 | Roberson et al. | 65—11 |

S. LEON BASHORE, Primary Examiner

R. L. LINDSAY, JR., Assistant Examiner

U.S. Cl. X.R.

13—18; 65—1, 2, 136, 337